United States Patent [19]

Ball et al.

[11] Patent Number: 4,964,422

[45] Date of Patent: Oct. 23, 1990

[54] BUTTERFLY-TYPE CHECK VALVE

[75] Inventors: Larry K. Ball, Chandler; Marshall U. Hines, Scottsdale, both of Ariz.

[73] Assignee: Allied-Signal Inc., Morris Township, Morris County, N.J.

[21] Appl. No.: 395,234

[22] Filed: Aug. 17, 1989

[51] Int. Cl.$^5$ ............................................ F16K 15/03
[52] U.S. Cl. ............................. 137/512.1; 137/512.2; 137/527
[58] Field of Search .................. 137/512.1, 512.2, 527, 137/599.2, 630, 630.15

[56] References Cited

U.S. PATENT DOCUMENTS

| | | |
|---|---|---|
| 212,556 | 2/1879 | Johnson . |
| 443,326 | 12/1890 | Leverich . |
| 932,172 | 8/1909 | Porter et al. . |
| 965,322 | 7/1910 | Peterson . |
| 1,167,145 | 1/1916 | Baverey . |
| 1,328,565 | 1/1920 | Howard . |
| 1,541,047 | 6/1925 | Hart . . |
| 1,744,798 | 1/1930 | Price . |
| 2,051,881 | 8/1936 | Mock . |
| 2,095,263 | 10/1937 | Moss . |
| 2,271,390 | 1/1942 | Dodson . |
| 2,796,082 | 6/1957 | Green ............................ 137/630.15 |
| 2,833,511 | 5/1958 | Fletcher . |
| 2,910,266 | 10/1959 | Condello et al. . |
| 3,008,685 | 11/1961 | Rudden . |
| 3,062,232 | 11/1962 | McGay . |
| 3,065,950 | 11/1962 | Goldberg . |
| 3,200,838 | 8/1965 | Sheaffer . |
| 3,298,659 | 1/1967 | Cupedo . |
| 3,344,808 | 10/1967 | Cary ................................ 137/599.2 |
| 3,400,907 | 9/1968 | Horn et al. . |
| 3,442,489 | 5/1969 | Cary et al. . |
| 3,516,640 | 6/1970 | Bryer et al. . |
| 3,545,486 | 1/1969 | Larson . |
| 3,675,681 | 7/1972 | Obermaier . |
| 3,677,297 | 7/1972 | Walton . |
| 3,794,288 | 2/1974 | Dolder et al. . |
| 3,960,177 | 6/1976 | Baumann . |
| 3,971,414 | 7/1976 | Illing . |
| 3,982,725 | 9/1976 | Clark . |
| 3,993,096 | 11/1976 | Wilson ............................. 137/512.1 |
| 4,084,617 | 4/1978 | Happe . |
| 4,190,074 | 2/1980 | Mailliet et al. . |
| 4,313,592 | 2/1982 | Baas . |
| 4,367,861 | 1/1983 | Bray et al. . |
| 4,508,132 | 4/1985 | Mayfield, Jr. et al. . |
| 4,534,538 | 8/1985 | Buckley et al. . |
| 4,556,192 | 12/1985 | Ramisch . |
| 4,586,693 | 5/1986 | Tinner . |
| 4,706,706 | 11/1987 | Page et al. . |
| 4,712,768 | 12/1987 | Herr et al. . |

FOREIGN PATENT DOCUMENTS 2821766  11/1979  Fed. Rep. of Germany .
1533073  of 1976  United Kingdom .

OTHER PUBLICATIONS

"Fishtail vs. Conventional Discs in Butterfly Valves", Carl D. Wilson, Instruments & Control Systems/vol. 41; Mar. 1968.
"A Note on the Reduction of the Fluid-Dynamic Torque of Butterfly Valves", D. W. Bryer and D. E. Walshe, National Physical Laboratory, Aerodynamics Division, Sep. 1966.

Primary Examiner—Robert G. Nilson
Attorney, Agent, or Firm—Joseph R. Black; Terry L. Miller; James W. McFarland

[57] ABSTRACT

A butterfly-type check valve (30) employs a secondary check valve (38) that is carried on the valve plate (36). The valve plate (36) is revolvable and translatable relative to the pivot shaft (34). In operation, the check valve (30) opens in response to a change in aerodynamic forces which act on the valve plate (36), the change being effected as a response to the opening of the secondary check valve (38). As the valve plate (36) rotates to an open position, its revolutionary movement relative to the shaft (34) changes the location of pivot points (40) relative to the surface (62) of the plate. This changes the areas (42, 44) of the surface (62) on both sides of the pivot points (40) so that the aerodynamic forces cause the valve (30) to open still further.

15 Claims, 3 Drawing Sheets

BUTTERFLY-TYPE CHECK VALVE

TECHNICAL FIELD

The present invention relates generally to check valves. More specifically, the invention relates to check valves which are operable to open in response to flow through a pilot valve, and which comprise a plate-like main valve member which is secured to a shaft in such manner that the valve member is revolvable and translatable relative to the shaft.

The invention employs various aspects of the teaching contained in U.S. Pat. application Ser. No. 374,897 entitled "Butterfly Valves With Actuators Carried On Valve Plate", which was filed on June 30, 1989. The disclosure thereof is incorporated herein by reference.

BACKGROUND OF THE INVENTION

FIG. 1 of the accompanying drawings schematically illustrates a conventional butterfly valve arrangement 10 in which a butterfly plate 12 positioned in a duct 14 is rotated about an axis defined by a spindle or shaft 16 in order to vary the rate at which fluid flows through the duct. Typically, the plate 12 is rotated via torque applied by an external actuator 18 through the shaft 16.

A series of arrows 20 generally illustrates the static pressure profile resulting from the aerodynamic or hydrodynamic forces acting on the butterfly plate 12. The overall effect of the static pressure may be represented by a center of pressure (indicated by the arrow 22) which tends to force the plate 12 to the closed position. This force must be countered or overcome by energy supplied to the actuator 18 in order to retain the position of the plate 12 or further open the valve 10.

As a general matter, in order to lower the externally-supplied energy required to match or exceed the hydrodynamic forces acting on the plate 12, the center of pressure 22 should be favorably altered in relation to the axis of rotation That is, either the center of pressure 22 should be aligned with or moved closer to the shaft 16, or the shaft should be aligned with or moved closer to the center of pressure.

The above-referenced application teaches, among other things, that if in the design of a butterfly valve one provides for relative translational movement between the shaft 16 and the plate 12, then the bulk of the energy required to torque the plate can be provided by the aerodynamic forces acting thereon. The present invention employs this and other teaching contained in said application to provide a butterfly-type check valve.

SUMMARY OF THE INVENTION

The invention is a butterfly-type check valve. The salient features of the invention in its broadest aspect are two. The first is that the butterfly plate is secured to the shaft in such manner that the plate is capable of revolutionary movement relative to the shaft, whereby the revolutionary movement effects translation of the plate relative to the shaft. The second is the provision of a secondary check valve or pilot valve carried on the plate. The importance of the pilot valve is that it provides a means for initially opening the check valve in response to aerodynamic forces which might otherwise tend to keep the butterfly plate in a closed position The importance of the first feature is that as the plate revolves and translates relative to the shaft, it also translates relative to a pivot line about which the plate can turn Thus, the position of the pivot line relative to the plate varies with the angle of rotation of the plate. The advantages thereby provided are better understood by reference to the following description, which includes the appended claims and accompanying drawings.

DESCRIPTION OF THE PREFERRED EMBODIMENT

Figure 1:
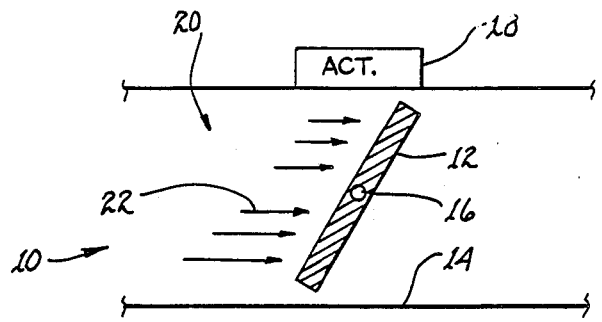
FIG. 1 is a schematic illustration of a conventional butterfly valve arrangement.
Figure 2A:
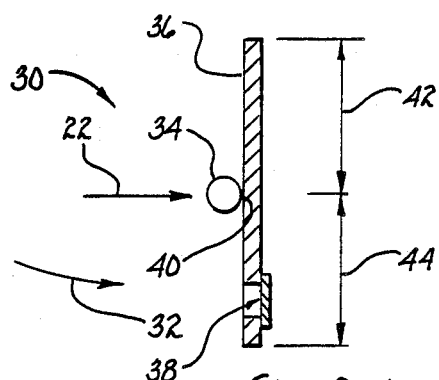
FIG. 2(a)–2(d) schematically illustrate the operation of a butterfly-type check valve in accordance with the invention.
Figure 2B:
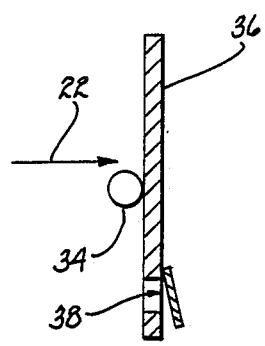
Figure 2C:
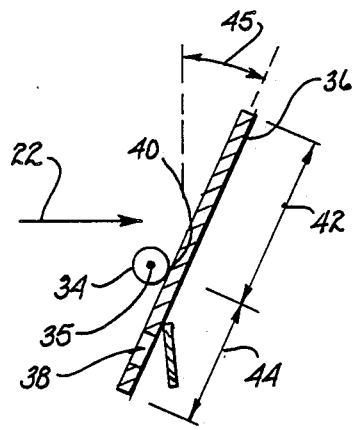
Figure 2D:
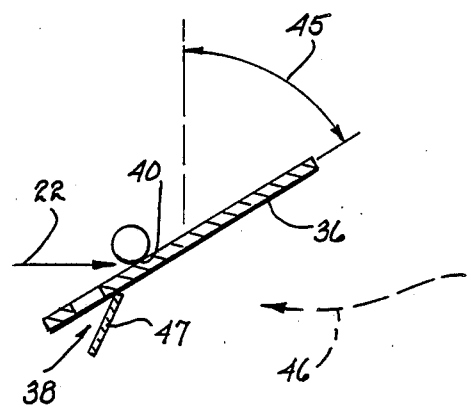

FIGS. 2A through 2D schematically illustrate the principles on which the check valve of the invention operates. In FIG. 2A, the valve 30 is shown in a closed position. The desired direction of fluid flow (indicated by arrow 32) is from left to right. The valve 30 comprises a shaft 34 defining a longitudinal axis 35, a plate-like valve member 36 (hereinafter "plate") that is secured to the shaft in such manner that the plate is capable of revolutionary and translational movement relative to the shaft, and a pilot valve 38 secured to and carried by the plate. Initially, with the pilot valve 38 closed, the center of pressure 22 associated with the aerodynamic forces acting on the plate 14 is aligned with the pivot point 40 about which the plate turns, as is illustrated in FIG. 2A (The pivot line 40 can be viewed as extending into the sheet in a direction parallel to both the axis 35 and the plate 36). As fluid pressure forces the pilot valve 38 open, the center of pressure 22 moves upward, as is illustrated in FIG. 2B. In response to the change in aerodynamic forces, the plate 36 rotates in a clockwise direction, as is illustrated in FIG. 2C. As the plate 36 rotates, it also undergoes revolutionary movement relative to the shaft 34. This revolutionary movement effects translational movement of the plate relative to the shaft. Thus, in FIG. 2A, the area (indicated in single dimension by arrows 42 and 44) of the plate 36 is the same on each side of the pivot line 40. However, in FIG. 2C, the area 42 above the pivot line 40 is greater than the area 44 below the pivot line. Assisted by the fact that the aerodynamic forces can act on a greater area 42 above the pivot line 40, the valve 30 will continue to open until the center of pressure 22 is again aligned with the pivot line 40, as is illustrated in FIG. 2D. The downward movement of the center of pressure 22 may be attributable to a number of factors. One such factor may be flow restriction by the shaft 34. Another is that the aerodynamic forces acting against the edge of the plate 36 become more influential as the plate moves to higher angles of rotation (angles of rotation being indicated generally by the curved arrow 45). Yet another is the aerodynamic force acting on the gating mechanism 47 of the pilot valve 38. If fluid flow is reversed as indicated by the dashed arrow 46, the pilot valve 38 is forced shut and the aerodynamic forces, assisted by the fact that the area 42 is greater than the area 44, rotate the plate 36 to the closed position indicated by FIG. 2A.

Figure 3:
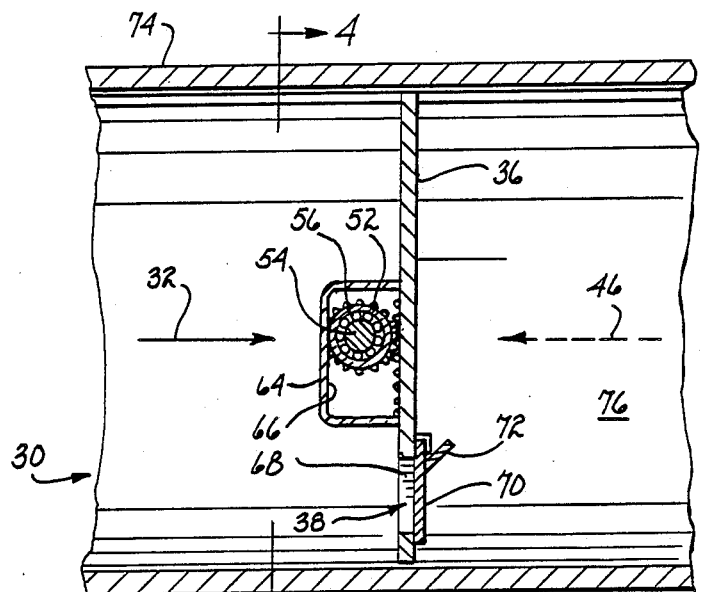
FIG. 3 is a cross-sectional view of the preferred embodiment of the invention and is taken along line 3—3 of FIG. 4.
Figure 4:
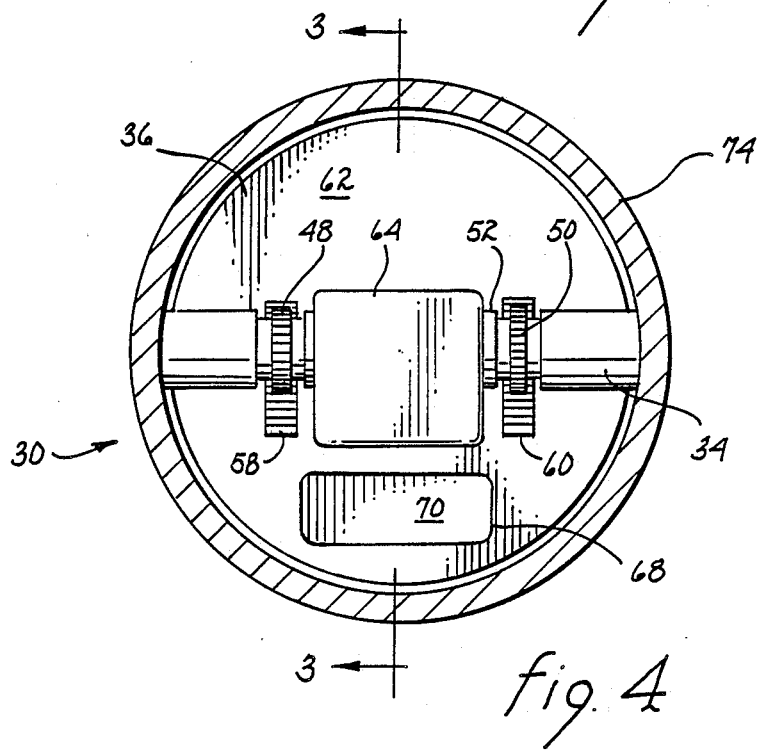
FIG. 4 is a generally elevational, partially cross-sectional view taken along line 4—4 of FIG. 3.

Referring now to FIGS. 3 and 4 a shaft 34 is formed from two axially-extending components to accommodate rigid securement of two spaced pinion gears 48, 50 to the shaft, and to provide for installation of a tubular sleeve 52. The sleeve 52 surrounds a centrally-disposed, recessed portion 54 of the shaft 34 and is freely rotatable thereabout via bearings 56. A plate 36 has two rectangular recesses (not shown) into which two rack gears 58, 60 are positioned and rigidly secured to the plate. The plate 36 is provided with a suitable rim seal (not shown) and is positioned parallel to the shaft 34 such that the latter equally bisects the plate and the rack gears 58, 60 engage the pinion gears 48, 50. To minimize binding, the gears 48, 50, 58, 60 and recesses are dimensioned to ensure that the contact points between the gears are nominally flush with the surface 62 of the plate 36. A generally C-shaped bracket 64 envelops the shaft 34 and is welded at its ends to the plate 36. The bracket 64 is dimensioned to accommodate the expected range of translational movement of the plate 36 relative to the shaft 34, and to ensure that its distal inner surface 66 abuts the outer surface of the sleeve 52. The plate 36 has a hole 68 formed therethrough. A reed, hinged flap 70, or functionally similar gating device is secured to the plate 36 so that it covers the hole 68. The flap 70 and hole 68 cooperate to form the pilot valve 38. The pilot valve 38 is essentially a secondary check valve and functions to effect a change in the location of the center of pressure 22 (FIG. 2) so that the check valve 30 opens when flow proceeds in the desired direction 32. A stop 72 secured to the flap 70 limits movement so that the flap can close when flow proceeds in the opposite direction 46. The shaft 34 is rigidly secured to a duct 74 so that it extends transversely across an elongate flow path 76 which is defined by the duct, and does not rotate about its axis 35 (FIG. 2).

Figure 5:
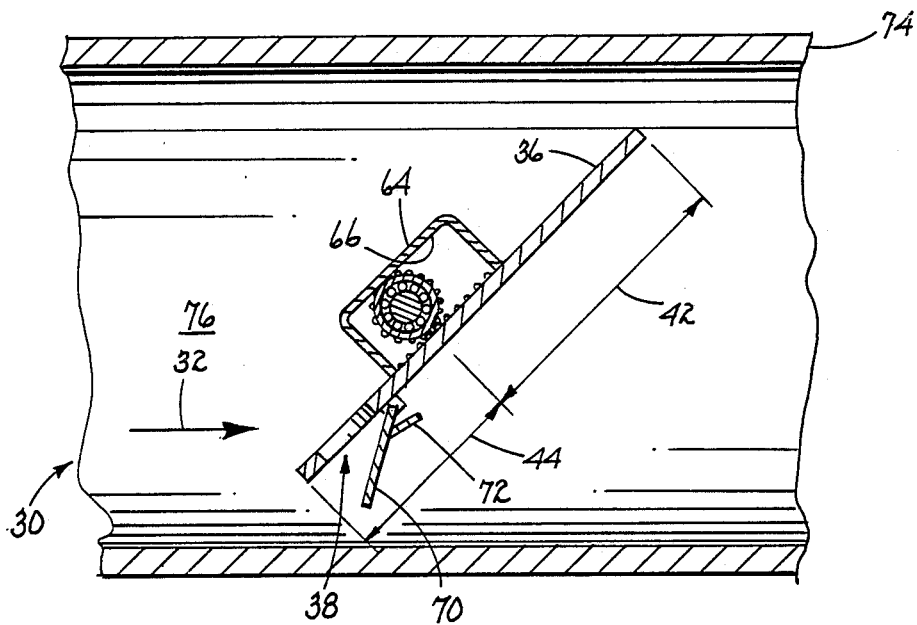
FIG. 5 is a cross-sectional view as in FIG. 3 and illustrates the check valve in an open position.

In operation, when flow proceeds in the desired direction 32, pressure exerted by the fluid on the flap 70 causes the pilot valve 38 to open, thus permitting flow through the pilot valve. This effectively moves the center of pressure 22 above the pivot line 40 (FIG. 2 — in the illustrated embodiment the pivot line is defined by the points of contact between the rack and pinion gears 48, 50, 58, 60). Consequently, the plate 36 rotates clockwise as viewed in FIGS. 3 and 5.

Since the axis of rotation of the plate 36 is not coincident with the axis 35 (FIG. 2) of the shaft 34, rotation is accompanied by revolutionary movement of the plate relative to the axis 35, which in turn is accompanied by translational movement of the plate relative to the axis 35. In effect, this can be viewed as a rolling motion of the plate 36 around the shaft 34.

In the simplest form of the invention, the plate 36 would abut the shaft 34 along a pivot line 40 (FIG. 2) extending across the plate. However, it is desirable to ensure that for a particular angle of rotation of the plate 36, there is a repeatable, particular degree of translational movement of the plate relative to the shaft 34. Accordingly, the illustrated embodiment incorporates mechanical timing means in the form of rack and pinion gears 48, 50, 58, 60 which prevent slippage between the plate 36 and the shaft 34. As an alternative to the illustrated timing means, one could employ an arrangement in which three strips of a flexible material are wound around the shaft 34 and suitably secured to both the shaft and the plate 36. Two outer strips would be wound in one direction and a central strip would be wound in an opposite direction. Such an arrangement would be similar in operation to that of a reel-type window shade.

Returning now to the operation of the check valve 30 and referring to FIGS. 2, 3, 4, and 5, as the plate 36 rotates clockwise the teeth of the rack gears 58, 60 sequentially engage the teeth of the pinion gears 48, 50, thus preventing slippage as the pivot line 40 moves clockwise around the stationary shaft 34 and downward along the plate 36. The area 42 above the pivot line 40 increases with increasing angles of rotation 45 until an angle is reached at which the center of pressure 22 is again aligned with the pivot line 40. A test has demonstrated that for a plate 36 with no protrusion (such as the flap 70), a "fully open" angle of rotation 45 of slightly less than ninety degrees can be achieved.

The effect of the flap 70 on the fully-open angle has not been determined. However, a number of possibilities are contemplated for either minimizing this effect or providing a particular fully-open angle in a given design. These include opening the flap 70 from the opposite side of the hole 68 (i.e. as viewed in FIG. 5 the flap would open downwardly instead of upwardly); appropriately dimensioning the flap and/or the stop 72: using a very thin reed instead of the flap; and in applications where the plate 36 is sufficiently thick, securing the flap to the plate inside the hole.

When flow proceeds in the opposite direction 46, aerodynamic forces act to close the flap 70. The center of pressure associated with these forces is so located relative to the pivot line 40 that the closing torque applied to the plate 36 is even greater than would obtain if the pivot line were centered relative to the plate. Consequently, the plate 36 is quickly rotated in a counterclockwise direction, with the rack gears 58, 60 rolling around the pinion gears 48, 50, until it reaches the closed position indicated by FIG. 3. If the plate 36 transitorily overshoots the closed position, the lower area 44 is made transitorily greater than the upper area 42 and the aerodynamic forces act to return the plate to the closed position. Conversely, if the plate 36 for any reason transitorily rotates in a clockwise direction while flow is proceeding from right to left, the upper area 42 is made transitorily greater than the lower area 44, and again the plate 36 is returned to the closed position.

The reader should understand that the foregoing text and accompanying drawings are not intended to restrict the scope of the invention to specific details which are ancillary to the teaching contained herein. Accordingly, the invention should be construed as broadly as is consistent with the following claims and their equivalents.

What is claimed is:

1. A butterfly-type check valve, comprising:
   a duct defining an elongate flow path for fluid
   a shaft supported across said duct and extending transversely across said flow path, said shaft defining a longitudinal axis:
   a plate-like valve member having a hole formed therethrough; said member being disposed in said flow path substantially parallel to said shaft: said member being secured to said shaft such that said member is capable of both revolutionary and translational movement relative to said axis; and
   gating means secured to said member and cooperable therewith for forming a secondary check valve that is operable to permit flow through said hole in one direction and to substantially prevent flow through said hole in an opposite direction.

2. The invention of claim 1 further comprising mechanical timing means secured to said member and said shaft for inhibiting slippage therebetween during said movement.

3. The invention of claim 2 wherein said timing means comprises a rack gear rigidly secured to said valve member and a pinion gear rigidly secured to said shaft and engaging said rack gear.

4. The invention of claim 1 wherein said axis defines a bisector for a surface of said member which generally faces said shaft, thereby defining first and second areas of said surface, and wherein said translational movement is accompanied by a decrease in one of said areas and an increase in the other of said areas.

5. A check valve, comprising:
a duct defining a flow path for fluid;
a shaft supported across said duct and extending across said flow path;
a plate-like member having a hole formed therethrough; said member being secured to said shaft in such manner that said member is revolvable and translatable relative to said shaft; and
a secondary check valve carried upon said member for permitting flow through said hole in one direction and substantially preventing flow through said hole in an opposite direction, whereby in operation said check valve opens in response to a change in forces exerted by said fluid on said member, said change occurring when said secondary check valve is opened in response to forces exerted thereon by said fluid.

6. The invention of claim 5 wherein said axis defines a bisector for a surface of said member which generally faces said shaft, thereby defining first and second areas of said surface, and wherein said translational movement is accompanied by a decrease in one of said areas and an increase in the other of said areas.

7. The invention of claim 6 further comprising mechanical timing means secured to said shaft and said member for inhibiting slippage therebetween.

8. The invention of claim 7 further comprising a tubular sleeve surrounding a centrally disposed portion of said shaft and being freely rotatable about said portion.

9. The invention of claim 8 wherein said timing means comprises a rack gear rigidly secured to said member and a pinion gear rigidly secured to said shaft and engaging said rack gear.

10. The invention of claim 9 wherein said shaft is rigidly secured to said duct.

11. A butterfly-type check valve, comprising:
a duct defining a flow path for fluid;
a shaft supported by said duct and extending transversely across said flow path, said shaft defining a longitudinal axis;
a plate-like member having a hole formed therethrough; said member being disposed in said flow path substantially parallel to said shaft; said member being secured to said shaft such that said member is capable of revolutionary movement relative to said axis;
means secured to said member and cooperable therewith for forming a pilot valve that is operable to permit flow through said hole in one direction and to substantially prevent flow through said hole in an opposite direction,
wherein said member contacts said shaft along a pivot line parallel to said axis, said revolutionary movement of said member effecting revolutionary movement of said pivot line relative to said axis.

12. A butterfly-type check valve, comprising:
a duct defining a flow path for fluid;
a shaft supported by said duct and extending transversely across said flow path, said shaft defining a longitudinal axis;
a plate-like member having a hole formed therethrough; said member being disposed in said flow path substantially parallel to said shaft; said member being secured to said shaft such that said member is capable of revolutionary movement relative to said axis;
means secured to said member and cooperable therewith for forming a pilot valve that is operable to permit flow through said hole in one direction and to substantially prevent flow through said hole in an opposite direction,
wherein said axis defines a bisector for a surface of said member which generally faces said shaft, thereby defining first and second areas of said surface, and wherein said revolutionary movement effects a decrease in one of said areas and a corresponding increase in the other of said areas.

13. The invention of claim 12 further comprising mechanical timing means secured to said member and said shaft for inhibiting slippage therebetween during said revolutionary movement.

14. The invention of claim 13 wherein said timing means comprises a rack gear rigidly secured to said member and a pinion gear rigidly secured to said shaft and engaging said rack gear.

15. The invention of claim 12 wherein said shaft is secured to said duct so that said shaft cannot rotate about said axis.

* * * * *